United States Patent [19]

Kawakami et al.

[11] 4,221,888
[45] Sep. 9, 1980

[54] METHOD OF HYDROLYZING ACRYLAMIDE AND METHACRYLAMIDE POLYMERS

[75] Inventors: Shigenao Kawakami, Hirakata; Shigenori Tajiri, Ibaraki; Hiroshi Tashiro; Shin-ichi Isaoka, both of Minoo, all of Japan

[73] Assignee: Sumitomo Chemical Company, Limited, Osaka, Japan

[21] Appl. No.: 941,857

[22] Filed: Sep. 13, 1978

[30] Foreign Application Priority Data

Sep. 27, 1977 [JP] Japan .................. 52-116537

[51] Int. Cl. ........................... C08f 8/2
[52] U.S. Cl. ........................... 525/369
[58] Field of Search .............. 526/47.9; 525/369

[56] References Cited

U.S. PATENT DOCUMENTS

| 2,861,059 | 11/1958 | Mowry et al. | 526/47.9 |
| 3,029,228 | 4/1962 | Glavis | 526/47.9 |
| 3,039,529 | 6/1962 | McKennon | 526/47.9 |

*Primary Examiner*—William F. Hamrock
*Attorney, Agent, or Firm*—Birch, Stewart, Kolasch & Birch

[57] ABSTRACT

A process for preparing hydrolyzed acrylamide and methacrylamide polymers which comprises hydrolyzing a powdery acrylamide or methacrylamide polymer dispersed in a solvent mixture comprising water and at least one water-miscible organic solvent selected from the group consisting of ketones, nitriles, ethers and furans.

13 Claims, No Drawings

METHOD OF HYDROLYZING ACRYLAMIDE AND METHACRYLAMIDE POLYMERS

The present invention relates to a process for preparing hydrolyzed acrylamide and methacrylamide polymers. More particularly, it relates to a process for preparing hydrolyzed products of acrylamide and methacrylamide polymers in a powdery form which are useful as flocculants and thickening agents for paper making.

Throughout the specification, the term "(meth)acrylamide polymer(s)" is intended to mean homopolymers of acrylamide or methacrylamide and copolymers of acrylamide or methacrylamide with at least one of other monomers copolymerizable therewith (e.g. acrylic acid, methacrylic acid, salts thereof), inclusively.

As anionic (meth)acrylamide polymers, there have heretofore been known partially sulfonized or hydrolyzed products of polyacrylamides, copolymers of acrylamide with acrylic acid or its salt, etc. Especially, copolymers of acrylamide with acrylic acid or its salt and partially hydrolyzed products of polyacrylamides are widely utilized as flocculants and thickening agents for paper making. Among them, the partially hydrolyzed products of polyacrylamides have been prepared by hydrolyzing polyacrylamides in an aqueous solution in the presence of an alkali. Since, however, this reaction is effected in an aqueous solution, the fluidity of the reaction mixture is lost when the concentration of the starting polyacrylamide in the system is high (e.g. 5% or more). Even when the concentration is low, the viscosity of the reaction mixture is extremely large, which makes its treatment troublesome. Besides, the objective substance is hardly obtainable in a dry powdery form.

For overcoming the above drawbacks, there has been proposed a method in which a powdery (meth)acrylamide polymer dispersed in an alcoholic solution is subjected to hydrolysis with an alkali hydroxide (Japanese Patent Publication (unexamined) No. 71589/1977). But, this method is not satisfactory in respect to the reaction conditions, the quality of the objective substance, etc.

For instance, the temperature for hydrolysis in the method is desired to be in a range of 60° to 70° C., because, gelation of the polymer takes place at a temperature higher than 70° C., while a long time is required for completion of the reaction at a temperature lower than 60° C. In fact, the hydrolysis in the working examples of the said Patent Publication is always carried out at 60° to 68° C. for 3 to 5 hours. However, it has been confirmed that, even if the temperature is lower than 70° C., gelation of the polymer proceeds when maintained at a temperature of around 70° C. for a long period of time. Therefore, it is important for preventing the gelation and for obtaining a product of higher quality that the temperature for hydrolysis is as much below 70° C. as possible and the reaction time is as short as possible. Further, in the method described in the said Patent Publication, stirring of the reaction system during the hydrolysis reaction is realizable only for a period of about 40 minutes after the initiation of the reaction; and thereafter, it becomes impossible. In addition, the product is obtained in a coagulated form so that its pulverization by the aid of a pulverizer or any other means is required, which is extremely disadvantageous from the industrial viewpoint. As to the cause of the said coagulation of the product, it is believed that the hydrolyzed product of the polymer is considerably swollen by the alcohol and also softened due to the high reaction temperature so that it becomes adhesive and therefore coagulative. When stirring is not conducted during the greater part of the time of the hydrolysis reaction and coagulation of the polymer occurs, the smooth elimination of heat becomes difficult, and due to the partial or local heating, the gelation of the polymer proceeds more readily.

As a result of the extensive study for overcoming the said drawbacks in the conventional method, it has been found that the use of a certain liquid medium makes it possible to accomplish smoothly the hydrolysis of a powdery (meth)acrylamide polymer dispersed in the liquid medium at a low temperature within a short period of time, during which stirring is always possible and partial or local superheating (i.e. uneven heating) does not materially occur, whereby the desired product is obtainable in a powdery form.

According to the present invention, there is provided a process for preparing hydrolyzed products of (meth)acrylamide polymers in a powdery form which comprises hydrolyzing a powdery acrylamide polymer dispersed in a solvent mixture comprising water and at least one water-miscible organic solvent selected from the group consisting of ketones, nitriles, ethers and furans.

In the process of the present invention, the hydrolysis reaction can be completed in a short time at a temperature much lower than the gelation temperature, and the polymer can be kept in a powdery state throughout the hydrolysis reaction, so that the coagulation of the polymer and the subsequent gelation are not caused at all and any operation for pulverization of the product is thus unnecessary.

For the hydrolysis reaction, a (meth)acrylamide polymer prepared by any polymerization process may be employed, provided that it is in a powdery form. When the (meth)acrylamide polymer is obtained as a lump, it may be pulverized prior to the use. When the polymer is produced in a powdery form already at the polymerization reaction as in precipitation polymerization or suspension polymerization (cf. Japanese Patent Publication (examined) No. 48903/1972 and Japanese Patent Publication (unexamined) No. 102687/1975), it may be employed as such for the hydrolysis reaction. The latter is particularly preferable, because the operations for pulverization and dispersion of the starting polymer in a solvent can be omitted and the quality of the obtained product is superior to the one obtained by the use of the polymer made through the operation for pulverization.

The organic solvent to be used may be a water-miscible one chosen from ketones, nitriles, ethers and furans. Examples of the ketones are acetone, acetonylacetone, diacetone alcohol, etc. Examples of the nitriles are acetonitrile, ethylene cyanohydrin, etc. Examples of the ethers are dioxane, dioxolan, etc. Examples of the furans are tetrahydrofuran, tetrahydrofurfuryl alcohol, etc. Among these organic solvents, acetone is the most preferable owing to its low toxicity, cheapness and facility in recovery.

In the solvent mixture comprising water and the said organic solvent, the concentration of the organic solvent is usually from 40 to 95% by weight, preferably from 50 to 90% by weight. When it is lower than 40% by weight, the polymer is swollen or dissolved to increase the viscosity of the reaction system so that stirring becomes difficult and elimination of heat can not be effected easily, which causes deterioration of the polymer. When higher than 95% by weight, the progress of the hydrolysis reaction becomes difficult.

As the hydrolyzing agent, there may be used an alkali hydroxide such as sodium hydroxide or potassium hydroxide. Normally, it is employed in the form of aqueous solution.

The temperature for the hydrolysis reaction is usually about 60° C. or lower, preferably from about 10 to 40° C. When it is lower than 10° C., an extremely long time is required for completion of the reaction. When higher than 60° C., the quality of the polymer is deteriorated or unfavorable side reactions occur.

The time for the hydrolysis reaction is, though varied depending on the reaction temperature, usually in a range of 30 minutes to 4 hours.

The proportion of the polymer in the solvent mixture at the hydrolysis reaction is usually from 50% by weight or less, preferably from 5 to 40% by weight, to the total weight of the reaction system. In case of the proportion being smaller than 5% by weight, the yield per one operation is reduced, which is economically disadvantageous. In case of the proportion being larger than 50% by weight, smooth stirring becomes difficult.

After completion of the hydrolysis reaction, the reaction mixture is filtered, and the collected material is washed with an organic solvent several times and dried to obtain the objective polymer in a powdery form.

Thus, according to the process of the invention, the hydrolysis reaction can be effected at a low temperature in a short time while keeping the powdery state of the polymer without occurrence of any side reaction or gelation even when the concentration of the starting acrylamide polymer is high, and as the result, a hydrolyzed (meth)acrylamide polymer of high quality can be readily obtained in a powdery form.

The hydrolyzed (meth)acrylamide polymer thus obtained possesses a much more excellent quality as a flocculant or a thickening agent for paper making, in comparison with the anionic copolymer obtained by copolymerization of acrylamide with acrylic acid or its salt as well as the (meth)acrylamide polymer hydrolyzed by a conventional process, even though the polymerization degree and the anionization degree are substantially equal.

The reason why such a superior quality is obtained in the hydrolyzed acrylamide polymer of the invention has not been clarified. But, it is thinkable that the sequence of the carboxyl groups in such polymer is different from that in the polymer obtained by a conventional hydrolysis process of the (meth)acrylamide and this difference may contribute to the difference of the quality.

The hydrolyzed (meth)acrylamide polymer obtained in the invention is particularly useful as a flocculant and a thickening agent for paper making. It is also utilizable, owing to its excellent quality, as a thickening agent for fibers, a reinforcing agent for paper, an adhesive, a dispersing agent, an auxiliary agent for secondary recovery of petroleum, etc.

The present invention will be hereinafter explained further in detail by the following Examples which do not afford any restriction thereto. In these Examples, % is by weight unless otherwise indicated.

EXAMPLE 1

The starting polyacrylamide is prepared according to the method as described in Japanese Patent Publication (unexamined) No. 102687/1975.

In a reaction vessel equipped with a stirrer, a cooling tube and a nitrogen-introducing tube, acrylamide (230 g), ion-exchanged water (490 g), acetone (220 g) and 5% polyvinyl alcohol (40 g) are charged, and after complete replacement of the atmosphere in the system by nitrogen gas, a 1% aqueous solution of potassium persulfate (10 ml) and a 2% aqueous solution of acid sodium sulfite (10 ml) are added thereto. The reaction is initiated within several minutes, and the reaction mixture becomes white and turbid with the progress of the reaction. The polymerization reaction is carried out under stirring in nitrogen stream at a temperature of 15° C. for about 90 minutes, at the end of which the Weissenberg phenomenon is just going to appear. At this stage, acetone (20 g) is gradually added to lower the viscosity of the reaction system so as to continue the polymerization reaction. The reaction is effected for further 6 hours with addition of acetone (20 g) every about 1 hour for regulation of the viscosity of the reaction system. After completion of the reaction, acetone (40 g) is added to the reaction mixture, and after elevation of the temperature up to about 40° C., acetone (300 g) is further added to precipitate polyacrylamide in a powdery form (hereinafter referred to as "slurry 1"). In the slurry 1, the concentration of acetone in the water-acetone mixture is about 55%, and the concentration of the polymer in the whole system is about 16%. A part of the polymer is taken out as a specimen and, after drying, subjected, as a 0.1% aqueous solution, to determination of the Brookfield viscosity whereby a value of 20 cps is obtained (25° C.; Rotor BL adaptor; rotation, 12 rpm).

To the slurry 1, a 50% aqueous solution of sodium hydroxide (77.7 g) (corresponding to 30 mol % to the amide groups in the polyacrylamide) is added, and hydrolysis is effected at 40° C. for 90 minutes. During the reaction, the polymer is kept in a powdery state, and stirring can be effected smoothly. After completion of the hydrolysis reaction, the product is washed with acetone several times and dried to obtain a hydrolyzed product of polyacrylamide (hereinafter referred to as "hydrolyzed polymer 1") as white granules. The Brookfield viscosity (0.1% aqueous solution) is 1,200 cps (25° C.; Rotor No. 2; rotation, 12 rpm). The anionization degree determined by the colloid titration method is 29.9 mol %. It is thus proved that almost theoretical hydrolysis is attained. The amount of unreacted acrylamide remaining in the polymer is extremely small (80 ppm).

EXAMPLE 2

The polyacrylamide slurry obtained as in Example 1 is filtered to collect a powdery polyacrylamide, which is in a granule state and shows a Brookfield viscosity of 20 cps (0.1% aqueous solution) (25° C.; Rotor BL adaptor; rotation, 12 rpm) (hereinafter referred to as "homopolymer 1").

The homopolymer 1 is dispersed in a mixture of water and acetone (acetone concentration, 55%) to make a polymer concentration of 16% to the whole system. An aqueous solution of sodium hydroxide corresponding to 30 mol % to the total amide groups in the polyacrylamide is added thereto, and hydrolysis is effected at 40° C. for 90 minutes. Then, the reaction mixture is treated as in Example 1 to obtain white granules (hereinafter referred to as "hydrolyzed polymer 2") showing a Brookfield viscosity of 1,050 cps (on 0.1% aqueous solution) (25° C.; Rotor No. 2; rotation, 12 rpm) and an anionization degree of 30.1 mol %.

EXAMPLE 3

The polyacrylamide slurry obtained as in Example 1 is subjected to hydrolysis as in Example 1 but using as the hydrolyzing agent an aqueous solution of sodium potassium corresponding to 30 mol % to the total amide groups. The thus obtained product (hereinafter referred to as "hydrolyzed polymer 3") shows a Brookfield viscosity of 1,100 cps (0.1% aqueous solution) (25° C.; Rotor No. 2; rotation, 12 rpm) and an anionization degree of 30.0 mol % (by the colloid titration).

EXAMPLES 4 to 8

The hydrolysis reaction is effected as in Example 2 but using the organic solvent shown in Table 1 in place of acetone. The viscosities and the anionization degrees of the products are shown in Table 1.

Table 1

| Example No. | Organic solvent | Brookfield viscosity (0.1% aqueous solution)* (cps) | Anionization degree (mol %) | Remarks (hereinafter referred to as) |
|---|---|---|---|---|
| 4 | Acetonitrile | 1080 | 30.0 | Hydrolyzed polymer 4 |
| 5 | Dioxane | 1000 | 29.8 | Hydrolyzed polymer 5 |
| 6 | Tetrahydrofuran | 1070 | 30.0 | Hydrolyzed polymer 6 |
| 7 | Acetonylacetone | 1050 | 29.9 | Hydrolyzed polymer 7 |
| 8 | Diacetone alcohol | 1050 | 29.9 | Hydrolyzed polymer 8 |

* )25° C.; Rotor No. 2; rotation, 12 rpm.

EXAMPLE 9

Polyacrylamide obtained by aqueous solution polymerization and subsequent pulverization (Brookfield viscosity (0.1% aqueous solution), 35 cps (25° C.; Rotor BL adaptor; rotation, 12 rpm)) is subjected to hydrolysis as in Example 2 to obtain a hydrolyzed polymer (hereinafter referred to as "hydrolyzed polymer 9") in a powdery state showing a Brookfield viscosity (0.1% aqueous solution) of 950 cps (25° C.; Rotor No. 2; rotation, 12 rpm) and an anionization degree of 29.9 mol %.

EXAMPLE 10

Powdery polyacrylamide obtained by reversed phase emulsion polymerization (Brookfield viscosity (0.1% aqueous solution), 10 cps (25° C.; Rotor BL adaptor; rotation, 12 rpm)) is subjected to hydrolysis as in Example 2 to obtain a product (hereinafter referred to as "hydrolyzed polymer 10") showing a Brookfield viscosity (0.1% aqueous solution) of 900 cps (25° C.; Rotor No. 2; rotation, 12 rpm) and an anionization degree of 29.7 mol %.

EXAMPLES 11 to 15

The hydrolysis reaction is effected as in Example 2 but changing the amount of sodium hydroxide to be used. The viscosities and the anionization degrees of the products are shown in Table 2.

Table 2

| Example No. | Amount of NaOH (mol % to amide groups) | Hydrolyzed polymer Anionization degree (mol %) | Brookfield viscosity (0.1% aqueous solution)* (cps) |
|---|---|---|---|
| 11 | 10 | 10.1 | 350 |
| 12 | 20 | 19.9 | 650 |
| 13 | 40 | 39.2 | 1300 |
| 14 | 50 | 48.5 | 1450 |
| 15 | 60 | 58.3 | 1500 |

* )25° C.; Rotor No. 2; rotation, 12 rpm.

EXAMPLE 16

An acrylamide-sodium acrylate copolymer obtained by aqueous solution polymerization and subsequent pulverization (Brookfield viscosity (0.1% aqueous solution), 200 cps (25° C.; Rotor No. 1; rotation, 12 rpm); anionization degree, 5.0 mol %) is hydrolyzed as in Example 2 in the presence of sodium hydroxide in such an amount as affording a hydrolyzed polymer showing an anionization degree of about 30 mol %. The modified polymer thus obtained (hereinafter referred to as "hydrolyzed polymer 11") shows a Brookfield viscosity (0.1% aqueous solution) of 965 cps (25° C.; Rotor No. 2; rotation, 12 rpm) and an anionization degree of 28.9 mol %.

COMPARATIVE EXAMPLES 1 to 5

The polyacrylamide obtained as in Example 2 is dispersed in a mixture of water and methanol having a varied methanol concentration shown in Table 3 to make a homopolymer concentration of 16% to the whole system. An aqueous solution of sodium hydroxide corresponding to 30 mol % to the total amide groups in the polyacrylamide is added thereto, and hydrolysis is effected for 3 hours under the conditions as shown in Table 3. The viscosities and the anionization degrees of the thus obtained products are shown in Table 3.

Table 3

| Comparative Example No. | Methanol concentration (%) | Reaction temperature (°C.) | Hydrolyzed polymer Anionization degree (mol %) | Brookfield viscosity (0.1% aqueous solution)* (cps) | Remarks |
|---|---|---|---|---|---|
| 1 | 60 | 40 | 12.5 | 410 | |
| 2 | 60 | 60 | 28.2 | 890 | Coagulation of polymer takes place during reaction; stirring becomes difficult; product is partially gelled. |
| 3 | 70 | 60 | 27.8 | 850 | |
| 4 | 80 | 60 | 24.5 | 800 | |
| 5 | 90 | 60 | 15.3 | 450 | |

*25° C.; Rotor No. 2; rotation, 12 rpm.

COMPARATIVE EXAMPLES 6 to 8

Copolymerization of acrylamide and sodium acrylate is effected by the process as shown in Table 4 to obtain an acrylamide-sodium acrylate copolymer having an anionization degree of about 30 mol %. The viscosities and the anionization degrees of the thus obtained copolymers are shown in Table 4.

Table 4

| Comparative Example No. | Polymerization process | Acrylamide-sodium acrylate copolymer | |
|---|---|---|---|
| | | Anionization degree (mol %) | Brookfield viscosity (0.1 % aqueous solution)*) (cps) |
| 6 | Method of Japanese Patent Publn. (unexamined) No. 102687/75 | 30.1 | 1050 |
| 7 | Aqueous solution polymerization | 30.0 | 970 |
| 8 | Reversed phase emulsion polymerization | 29.8 | 930 |

*)25° C.; Rotor No. 2; rotation, 12 rpm.

REFERENCE EXAMPLE 1

Using the hydrolyzed polymers and the acrylamide-sodium acrylate copolymers obtained in Examples 1 to 16 and Comparative Examples 1 to 8, the jar test is effected on a 7% suspension of calcium carbonate. Namely, after stirring for 1 minute at 150 rpm, the size of flocks (diameter of flocks) is observed. After allowing to stand for 1 minute, the turbidity of the supernatant is determined. The amount of the polymer added is 5 ppm to the treated liquid. The results are shown in Table 5.

Table 5

| | | Polymer used | Diameter of flock*1) | Turbidity*2) |
|---|---|---|---|---|
| Example No. | 1 | Hydrolyzed polymer 1 | $D_6$ | 2 |
| | 2 | Hydrolyzed polymer 2 | $D_5$–$D_6$ | 5 |
| | 3 | Hydrolyzed polymer 3 | $D_5$–$D_6$ | 4 |
| | 4 | Hydrolyzed polymer 4 | $D_5$–$D_6$ | 5 |
| | 5 | Hydrolyzed polymer 5 | $D_5$–$D_6$ | 5 |
| | 6 | Hydrolyzed polymer 6 | $D_5$–$D_6$ | 5 |
| | 7 | Hydrolyzed polymer 7 | $D_5$ | 7 |
| | 8 | Hydrolyzed polymer 8 | $D_5$–$D_6$ | 5 |
| | 9 | Hydrolyzed polymer 9 | $D_4$–$D_5$ | 8 |
| | 10 | Hydrolyzed polymer 10 | $D_4$–$D_5$ | 10 |
| | 11 | Hydrolyzed polymer 11 | $D_4$–$D_5$ | 8 |
| Comparative Example No. | 12 | Copolymer obtained in Comparative Example 2 | $D_3$ | 30 |
| | 13 | Copolymer obtained in Comparative Example 6 | $D_4$ | 14 |
| | 14 | Copolymer obtained in Comparative Example 7 | $D_3$–$D_4$ | 20 |
| | 15 | Copolymer obtained in Comparative Example 8 | $D_3$–$D_4$ | 25 |

*1)Average diameter of flocks by macroscopic determination ($D_3$ = average diameter of 3 mm).
*2)According to JIS (Japanese Industrial Standard) K-0101.

REFERENCE EXAMPLE 2

Using the hydrolyzed polymers and the acrylamide-sodium acrylate copolymers obtained in Examples 1 to 16 and Comparative Examples 1 to 8, the paper making test is carried out in the following manner.

Pulp material:
Commercially available NBKP (needle leaf tree bleached kraft pulp) is smashed by a beater to obtain Canadian Freeness (700 ml), which is employed as the pulp material.

Condition for paper making:
To the pulp material, the polymer shown in Table 6 is added, and paper making is effected by the aid of a paper making machine of square type. Then, evaluation of formation is effected (basis weight, 50 g/m$^2$).

Evaluation:
Relative evaluation is effected on the ability for paper making with addition of the same amount of thickening agent (1.5 W/W % to pulp). The results are shown in Table 6.

Table 6

| | | Polymer used | Water-solubility | Evaluation of formation |
|---|---|---|---|---|
| Example No. | 16 | Hydrolyzed polymer 1 | Good | Excellent |
| | 17 | Hydrolyzed polymer 2 | Good | Good - Excellent |
| | 18 | Hydrolyzed polymer 3 | Good | Good - Excellent |
| | 19 | Hydrolyzed polymer 4 | Good | Good - Excellent |
| | 20 | Hydrolyzed polymer 5 | Good | Good - Excellent |
| | 21 | Hydrolyzed polymer 6 | Good | Good - Excellent |
| | 22 | Hydrolyzed polymer 7 | Good | Good - Excellent |
| | 23 | Hydrolyzed polymer 8 | Good | Good - Excellent |
| | 24 | Hydrolyzed polymer 9 | Good | Good - Excellent |
| | 25 | Hydrolyzed polymer 10 | Good | Good - Excellent |
| | 26 | Hydrolyzed polymer 11 | Good | Good - Excellent |
| Comparative Example No. | 27 | Copolymer obtained in Comparative Example 2 | Bad | Bad |
| | 28 | Copolymer obtained in Comparative Example 7 | Good | Passable |
| | 29 | Copolymer obtained in Comparative Example 8 | Good | Passable |

What is claimed is:

1. A process for preparing hydrolyzed acrylamide and methacrylamide polymers which comprises hydrolyzing a powdery acrylamide or methacrylamide polymer dispersed in a solvent mixture comprising water and at least one organic solvent selected from the group consisting of ketones, nitriles, ethers and furans at a temperature of from 10° to 40° C. wherein the concentration of the organic solvent in the solvent mixture is from 40 to 95% by weight and the hydrolysis is effected with alkali hydroxide in a chemically equivalent amount to the amide group to be hydrolyzed.

2. The process according to claim 1, wherein the powdery acrylamide or methacrylamide polymer is polyacrylamide.

3. The process according to claim 1, wherein the powdery acrylamide or methacrylamide polymer is a copolymer of acrylamide and acrylic acid or a salt thereof.

4. The process according to claim 1, wherein the concentration of the powdery acrylamide or methacrylamide polymer in the reaction system is not more than 50% by weight.

5. The process according to claim 4, wherein the concentration of the powdery acrylamide or methacrylamide polymer in the reaction system is from 5 to 40% by weight.

6. The process according to claim 1, wherein the organic solvent is acetone.

7. The process according to claim 1, wherein the alkali hydroxide is sodium hydroxide or potassium hydroxide.

8. The process according to claim 1, wherein the hydrolysis is effected within a period of 30 minutes to 4 hours.

9. A process for preparing hydrolyzed acrylamide and methacrylamide polymers which comprises hydrolyzing a powdery acrylamide or methacrylamide polymer dispersed in a solvent mixture, at a temperature lower than the gelation temperature, said solvent mixture comprising water and at least one organic solvent selected from the group consisting of ketones, nitriles, ethers and furans wherein the concentration of the organic solvent in the solvent mixture is from 40 to 95% by weight and the ghdrolysis is effected with alkali hydroxide in a chemically equivalent amount to the amide group to be hydroxyzed.

10. The process of claim 9 wherein the ketone is selected from the group consisting of acetone, acetonyl acetone and diacetone alcohol.

11. The process of claim 9 wherein the nitrile is selected from the group consisting of acetonitrile and ethylene cyanohydrin.

12. The process of claim 9 wherein the ether is selected from the group consisting of dioxane and dioxolane.

13. The process of claim 9 wherein the furans is selected from the group consisting of tetrahydrofuran and tetrahydrofurfuryl alcohol.

* * * * *